United States Patent
Nawab Ali

(10) Patent No.: US 9,396,128 B2
(45) Date of Patent: Jul. 19, 2016

(54) SYSTEM AND METHOD FOR DYNAMIC ALLOCATION OF UNIFIED CACHE TO ONE OR MORE LOGICAL UNITS

(71) Applicant: SAMSUNG ELECTRONICS CO., LTD., Suwon-Si, Gyeonggi-Do (KR)

(72) Inventor: Imtiaz Ahmed Nawab Ali, Bangalore (IN)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 88 days.

(21) Appl. No.: 14/274,815

(22) Filed: May 12, 2014

(65) Prior Publication Data

US 2014/0372706 A1    Dec. 18, 2014

(30) Foreign Application Priority Data

Jun. 13, 2013 (IN) .............................. 2572/CHE/2013
Nov. 14, 2013 (KR) ......................... 10-2013-0138458

(51) Int. Cl.
*G06F 12/08* (2016.01)
*G06F 3/06* (2006.01)
*G06F 12/12* (2016.01)

(52) U.S. Cl.
CPC .............. *G06F 12/0891* (2013.01); *G06F 3/06* (2013.01); *G06F 12/0871* (2013.01); *G06F 12/0873* (2013.01); *G06F 12/084* (2013.01); *G06F 12/121* (2013.01); *G06F 2212/1016* (2013.01)

(58) Field of Classification Search
CPC ........................... G06F 12/0871; G06F 12/084
USPC .................................................... 711/123, 135
See application file for complete search history.

(56) References Cited

U.S. PATENT DOCUMENTS

| | | | |
|---|---|---|---|
| 6,662,272 B2 | 12/2003 | Olarig et al. | |
| 7,886,114 B2 | 2/2011 | Gotoh | |
| 7,979,639 B2 | 7/2011 | Koseki | |
| 7,996,609 B2 | 8/2011 | Ash et al. | |
| 2004/0193803 A1* | 9/2004 | Mogi et al. | 711/129 |
| 2005/0071599 A1* | 3/2005 | Modha et al. | 711/170 |
| 2009/0210620 A1 | 8/2009 | Jibbe et al. | |
| 2012/0254533 A1 | 10/2012 | Jibbe et al. | |
| 2012/0254548 A1 | 10/2012 | Comparan et al. | |
| 2013/0238845 A1* | 9/2013 | Yamamoto et al. | 711/103 |

FOREIGN PATENT DOCUMENTS

JP        2005182185        7/2005

* cited by examiner

*Primary Examiner* — Than Nguyen
(74) *Attorney, Agent, or Firm* — Volentine & Whitt, PLLC

(57) ABSTRACT

A system and method provide a unified cache in a Small Computer System Interface (SCSI) device which can be dynamically allocated to one or more Logical Units (LUs). A cache balancer module of the SCSI device can allocate the entire unified cache to a single LU, or divide the unified cache among multiple LUs. The cache entries for each LU can be further classified based on Quality of Service (QoS) traffic classes within each LU thereby improving the QoS performance. The system provides a cache allocation table that maintains a unified cache allocation status for each LU.

19 Claims, 7 Drawing Sheets

SYSTEM AND METHOD FOR DYNAMIC ALLOCATION OF UNIFIED CACHE TO ONE OR MORE LOGICAL UNITS

CROSS-REFERENCE TO RELATED APPLICATIONS

This application is based on and claims priorities from Indian Patent Application No. 2572/CHE/2013 filed on Jun. 13, 2013 in the Indian Intellectual Property Office, and Korean Patent Application No. 10-2013-0138458 filed on Nov. 14, 2013 in the Korean Intellectual Property Office, the disclosure of which is incorporated herein in its entirety by reference.

BACKGROUND

1. Field of the Inventive Concept

The present invention relates to data storage systems and more particularly relates to dynamic allocation of cache to one or more Logical Units (LUs) in a Small System Computer Interface (SCSI) data storage system.

2. Description of the Prior Art

Data storage systems process, compile, store, and/or communicate the data to a user as and when required. To provide effective and efficient processing and storage of the data, enhancing the performance of input/output (I/O) operations is important. Some data storage systems utilize cache memory (cache) to achieve enhanced I/O performance. Small Computer System Interface (SCSI) devices are increasingly becoming more common and widely deployed in many data storage systems. SCSI is a set of standards for connecting peripheral storage devices like disk drives, CD-ROM drives to a host device such as a mobile device, a server, a personal computer or the like. A SCSI device is a host adapter or intelligent peripheral storage devices which can be attached to a SCSI bus. SCSI devices are generally faster and are used in high performance data storage systems such as web servers. A SCSI data storage system comprising a SCSI device provides storage drives identified by a Logical Unit Number (LUN). Each LUN identifies a specific Logical Unit (LU), which may be a part of a hard disk drive, an entire hard disk, or several hard disks in a storage system. The LUN could reference an entire Redundant Array of Independent Disks (RAID) set, a single disk or partition, multiple hard disks, or multiple partitions within the hard disk. A SCSI device may use cache to improve the performance of the I/O operations.

The cache allocation policy implemented by a SCSI device for caching WRITEs to, or READs from, the LUs is expected to provide optimal usage of the cache and enhance the I/O performance of the SCSI device. However, most existing cache allocation policies in data storage systems are based on static cache allocation to each LU. The segment of cache allocated to each LU is further statically subdivided into a read cache sub portion and a write cache sub portion. Thus, once a segment of the cache is statically allocated it remains unavailable for allocation, even though the allocated segment is not used entirely by the LU. This effectively degrades cache usage.

Some existing cache allocation policies provide switching between fixed cache and scalable cache based on the I/O requirement in the data storage system. Addition of scalable cache increases hardware complexity. Some existing methods provide dynamic allocation of cache based on Quality of Service (QoS) traffic classes but fail to address dynamic allocation based on the requirements from each LU.

Data is transferred between the LU and the cache in data blocks of fixed size called logical blocks and each logical block is addressed by a unique Logical Block address (LBA). Whenever a data block is copied from the LU into the cache, a cache entry is created. Every cache entry includes the copied data and corresponding metadata. Moreover, searching through the metadata of a large number of cache entries in SCSI devices is tedious and time consuming operation. Thus, existing methods for SCSI devices invalidate all cache entries using a cache flush operation (for example, using a synchronize cache command) in the SCSI device cache when a predefined criterion is satisfied. However, flushing the cache is an expensive operation and frequent flushing degrades system performance.

SUMMARY

An object of the embodiments herein is to provide a system and method for dynamically allocating a unified cache to one or more Logical Units (LUs) of a Small Computer Storage Interface (SCSI) device.

Another object of the invention is to provide a system that comprises a cache allocation table for all of the LUs to maintain a unified cache allocation status.

Another object of the invention is to provide a system that enables the SCSI device to search the cache allocation table to selectively flush (evict) the cache entries in the unified cache.

Another object of the invention to provide a system to dynamically allocate the unified cache by classifying the cache entries based on Quality of Service (QoS) traffic classes of one or more LUs.

Accordingly, one aspect of the invention provides a system for dynamically allocating a unified cache to at least one Logical Unit (LU) of a Small Computer System Interface (SCSI) device, wherein the system comprises a host device and the SCSI device. Further the SCSI device comprises a unified cache module, a cache allocation table, and a cache balancer module. Further the cache balancer module is configured to allocate at least one cache slot in the unified cache module to the at least one LU in response to receiving an input/output (I/O) request from the host device. The cache balancer module is further configured to log at least one cache entry by caching data for the received I/O request to the at least one cache slot of the unified cache. Further, the cache balancer module is configured to register a table entry corresponding to the allocated at least one cache slot into said cache allocation table of the at least one LU.

Another aspect of the invention provides a method for dynamically allocating a unified cache to at least one Logical Unit (LU) of a Small Computer System Interface (SCSI) device, wherein the method comprises allocating at least one cache slot in a unified cache module to the at least one LU in response to receiving an input/output (I/O) request from a host device. Further, the method comprises a cache allocation unit logging at least one cache entry by caching data for the received I/O request to the at least one cache slot of the unified cache. Furthermore, the method comprises registering a table entry corresponding to the allocated at least one cache slot into a cache allocation table of the at least one LU.

Yet another aspect of the invention provides a device, comprising: a first memory device having stored therein a unified cache comprising cached data of one or more of a plurality of logical units of a host device, arranged in a plurality of cache slots, wherein at least some of the cache slots are dynamically-allocatable between the logical units; a second memory device having stored therein a cache allocation table comprising a plurality of table entries each corresponding to at least one allocated cache slot in the unified cache, the cache allocation table being arranged to identify which of the allocated caches slots of the unified cache are allocated to which of the logical units; and a cache balancer module. The cache balancer module is configured to: dynamically allocate the cache slots in the unified cache among the logical units in response to receiving input/output (I/O) requests from the host device; log cache entries for caching the data for the received I/O requests to the allocated cache slots of the unified cache; and register in the cache allocation table the table entries corresponding to the allocated cache slots for each logical unit.

In some embodiments, the cache balancer module is configured to dynamically allocate a number of the cache slots for data stored in each logical unit based on a cache allocation policy which considers a quality of service traffic class for the data.

In some embodiments, the device further comprises a plurality of timers assigned to a plurality of the cache entries in the unified cache, wherein the device is configured to determine that a cache entry is stale if the cache entry has not been accessed or modified for a predetermined time as measured by the timer assigned to the cache entry.

In some versions of these embodiments, when a cache entry is determined to be stale, the cache balancer module de-allocates segments of the unified cache that correspond to the cache entry.

In some versions of these embodiments, a first timer having a first time period is assigned to a first cache entry belonging to a first quality of service traffic class, and wherein a second timer having a second time period shorter than the first time period is assigned to a second cache entry belonging to a second quality of service traffic class which is lower than the first quality of service traffic class.

In some embodiments, the first memory device is the same as the second memory device.

In some embodiments, the cache balancer module comprises a processor executing a software algorithm.

In some embodiments, the device further comprises a Small Computer System Interface (SCSI) configured to receive the input/output (I/O) requests from the host device.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

BRIEF DESCRIPTION OF THE DRAWINGS

This invention is illustrated in the accompanying drawings, throughout which like reference letters indicate corresponding parts in the various figures. The embodiments herein will be better understood from the following description with reference to the drawings, in which.

DETAILED DESCRIPTION OF THE EMBODIMENTS

Figure 1:
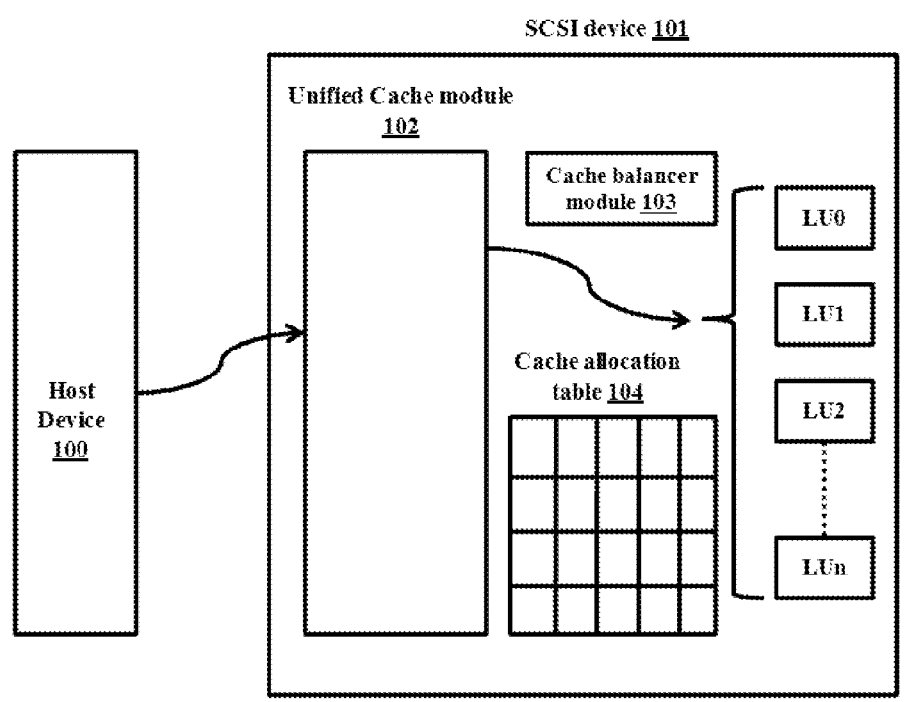
FIG. 1 illustrates an overview of Small Computer Serial Interface (SCSI) data storage system that enables dynamic allocation of a unified cache to one or more Logical Units (LUs), according to embodiments as disclosed herein.

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. The examples used herein are intended merely to facilitate an understanding of ways in which the embodiments herein can be practiced and to further enable those of skill in the art to practice the embodiments herein. Accordingly, the examples should not be construed as limiting the scope of the embodiments herein.

The embodiments herein achieve a system and method that provides a unified cache in a Small Computer System Interface (SCSI) device which can be dynamically allocated to one or more Logical Units (LUs) based on requirements for input/output (I/O) operations. The number of cache entries for each LU in the unified cache may be dynamically allocated by a cache balancer module based on factors such as a cache allocation policy adopted by the cache balancer module, the requirements of each LU, or the like. Thus, the cache balancer module can allocate an entire unified cache to a single LU, or divide the unified cache among multiple LUs.

In an embodiment, the cache entries for each LU can be classified based on Quality of Service (QoS) traffic classes within each LU, which improves the QoS performance.

The system comprises a cache allocation table that maintains a unified cache allocation status for cache entries of each LU. The cache allocation table comprises table entries providing metadata for the cache entries. The cache balancer module updates table entries into the cache allocation table for every cache entry of each respective LU or eviction (selective flush) of the cache entry from the unified cache.

The system enables the cache balancer module to efficiently search the cache allocation table to evict cache entries in the unified cache. The table entries of the cache allocation table store the metadata of the cache entries in a unique way, enabling efficient search operation for evicting the cache entries.

In an embodiment, the system enables the cache balancer module to assign timers to one or more cache entries to track stale cache entries. The system can determine that the cache entry is stale if the cache entry has not been accessed or modified for a predetermined time. If the cache entry is stale, the entry may be preemptively evicted. Whenever the assigned timer for the cache entry expires, the cache balancer module de-allocates the segments of unified cache that correspond to the cache entry. The system disclosed improves cache performance and effectively enhance SCSI data storage system performance with higher percentage of cache hits and nearly no cache misses.

In an embodiment, a host device can initiate selective flushing of the unified cache.

Throughout the description the terms unified cache and cache are used interchangeably.

Throughout the description the terms QoS traffic class and QoS class are used interchangeably.

Throughout the description the terms data and data block are used interchangeably.

Throughout the description the terms one and single are used interchangeably.

Referring now to the drawings, and more particularly to FIGS. 1 through 7, where similar reference characters denote corresponding features consistently throughout the figures, there are shown preferred embodiments.

FIG. 1 illustrates an overview of SCSI data storage system that enables dynamic allocation of a unified cache to one or more Logical Units (LUs), according to embodiments as disclosed herein. FIG. 1 depicts a host device 100 and a SCSI device 101.

In an embodiment, host device 100 can be a smart phone, a personal Digital Assistant (PDA), a Personal Computer (PC), a server, any other SCSI device or the like providing a SCSI to interconnect with SCSI device 101. SCSI device 101 can comprise a host adapter or one or more intelligent peripheral storage devices which can be attached to a SCSI bus.

SCSI device 101 may include a plurality of logical units (LUs), LU0, LU1, LU2 . . . LUn. In an embodiment where SCSI device 101 is a host adapter, then the LUs may be external to SCSI device 101. Each LU is identified by a unique Logical Unit Number (LUN) and the LU can be a partition of a hard disk drive, an entire hard disk or several hard disks in a storage device. The LUN could reference an entire Redundant Array of Independent Disks (RAID) set, a single disk or partition, or multiple hard disks or partitions.

SCSI device 101 comprises a unified cache module 102, a cache balancer module 103 and a cache allocation table 104. In some embodiments, unified cache module 102 may comprise one or more first memory devices (e.g., volatile or nonvolatile memory) of SCSI device 101, such as random access memory (RAM), FLASH memory, or the like, which store(s) a unified cache for one or more or all of logical units (LUs), LU0, LU1, LU2 . . . LUn. In some embodiments, cache balancer module 103 may comprise a processor of SCSI device 101 executing a software algorithm based on computer readable instruction which may be stored in firmware or memory (e.g., nonvolatile memory) of SCSI device 101. In other embodiments, cache balancer module 103 may comprise hardware, or a combination of hardware and firmware, which is configured to perform the various operations described below. In some embodiments, cache allocation table 104 may be stored in a second memory device, such as RAM, FLASH memory, or the like, in a format which is understood and accessible by cache balancer module 103. In various embodiments, the first memory device which stores the unified cache may be the same memory device, or a different memory device, from the second memory device which stores cache allocation table 104.

In operation, host device 100 requests an input/output (I/O) operation to READ from, or WRITE to, any of the LUs, LU0, LU1, LU2 . . . LUn, via unified cache module 102, which may cache data from one or more or all of the LUs. Cache balancer module 103 allocates the segments of the unified cache module 102 to log cache entries for the I/O operation requested by host device 100. Unified cache module 102 allocates the segment based on a cache policy comprising parameters such as the size of data (number of logical blocks to be cached), the data traffic load, QoS traffic classes or the like. SCSI 101 provides cache allocation table 104 for each LU (LU0-LUn) that maintains cache allocation status of the respective LU. Whenever the cache entry (caching of the requested data for read or write operation) is logged in unified cache module 102, cache balancer module 103 updates cache allocation table 104 for the respective LU with the corresponding table entry. The table entry provides the metadata for the corresponding cache entry. In some embodiments, cache allocation table 104 may comprise one table with different sections of portions assigned to each LU. Such sections or portions may or may not be arranged contiguously in memory. In some embodiments, cache allocation table 104 may comprise a plurality of cache allocation "sub-tables" each assigned to a particular LU. Such "sub-tables" may or may not be arranged contiguously in memory. Other arrangements for providing cache allocation table 104 are contemplated.

In an embodiment, the table entry comprises two elements, in which the first element indicates the address of the allocated cache slot, and the second element indicates the number of contiguous cache entries in the cache slot. One or more cache slots can be allocated to one or more LUs where each cache slot comprises one or more contiguous cache entries of a single LU. Thus, the size of a cache slot is variable and equals to number of contiguous cache entries of one LU in the cache slot. Each cache slot is identified by a unique address.

Figure 2:
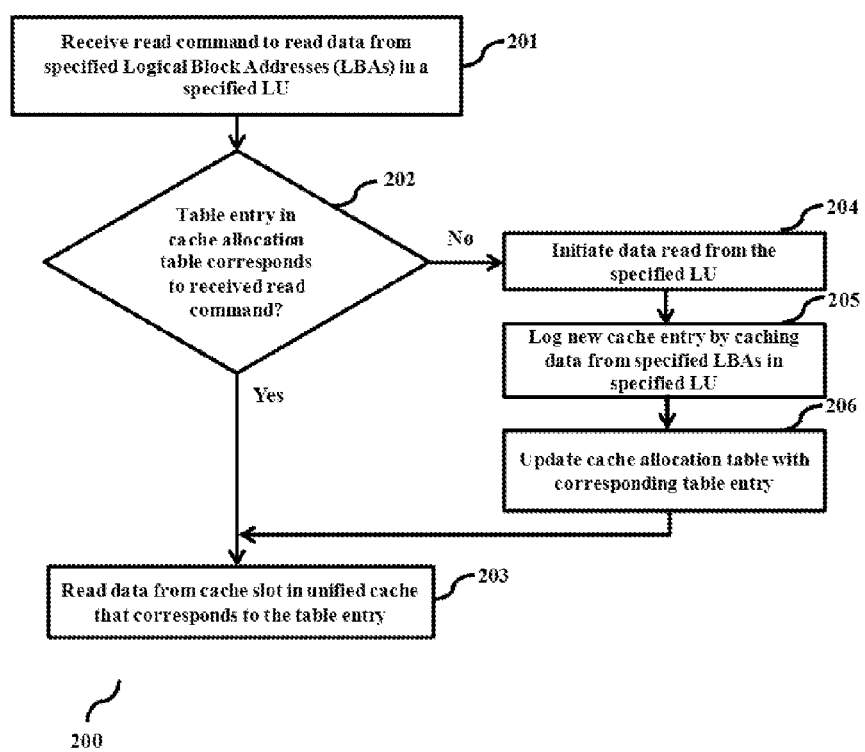
FIG. 2 shows a flow diagram for explaining an example read operation using the unified cache, according to embodiments as disclosed herein.

FIG. 2 shows a flow diagram 200 for explaining an example read operation using the unified cache, according to embodiments as disclosed herein. As depicted in FIG. 2, in an operation (201), SCSI device 101 receives a read data command from host device 100. The read command instructs SCSI device 101 to read logical blocks by providing the specific logical block addresses of the specific LU where the data blocks (logical blocks) to be read resides. In an operation (202) cache balancer module 103 checks to determine if any of the existing table entries in cache allocation table 104 match the received read command. Beneficially, the table entry format employed by SCSI device 101 enables simplified and efficient search. If cache balancer module 103 detects a match, then it provides a cache hit and in operation (203) host device 100 reads one or more cache entries from the cache slot indicated that corresponds to the detected table entry.

If in operation (202) cache balancer module 103 fails to detect a table entry that matches the received read command, then cache balancer module 103 informs host device 100 that a cache miss has occurred. On receiving indication of cache miss, in operation (204) host device 100 initiates a data read operation from the specified LU.

In one or more embodiments, cache balancer module 103 may initiate the data read operation from the specified LU, whenever a cache miss occurs.

In operation (205) cache balancer module 203 logs a new cache entry by caching data from specified LBAs in the specified LU as received in response to the read command issued by host device 100. In operation (206) cache balancer module 203 updates cache allocation table 104 by registering a corresponding table entry (indicating the allocated cache slot address and number of contiguous cache entries in the cache slot) into cache allocation table 104 for the specified LU. In operation (203) host device 100 reads the data from the cache slots corresponding to the updated table entry. In various embodiments, various operations of method 200 may be performed in the order presented, in a different order or simultaneously. Further, in some embodiments, some operations shown in FIG. 2 may be omitted.

Figure 3:
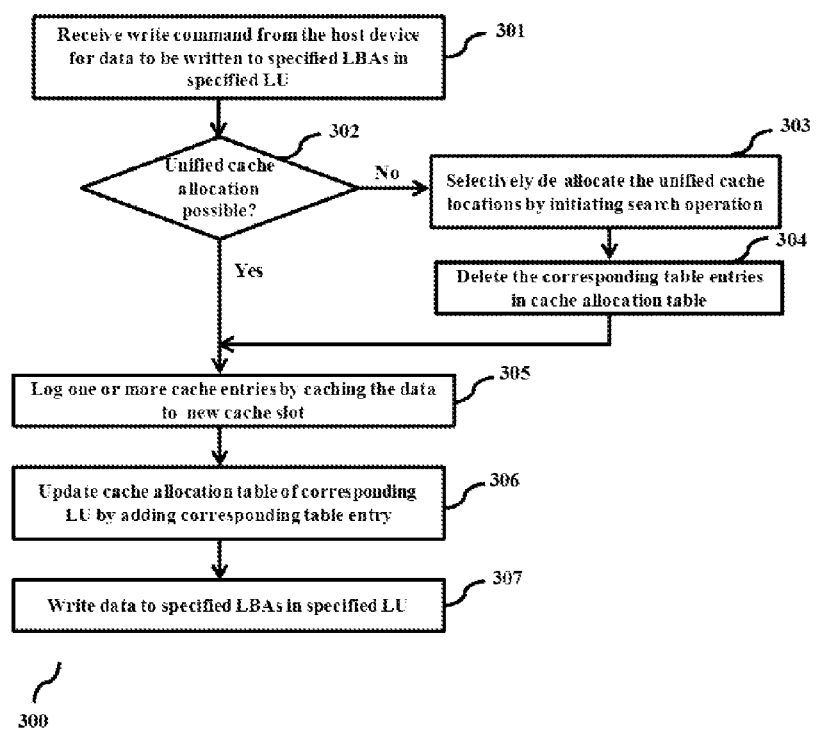
FIG. 3 shows a flow diagram for explaining an example write operation using the unified cache, according to embodiments as disclosed herein.

FIG. 3 shows a flow diagram 300 for explaining an example write operation using the unified cache, according to embodiments as disclosed herein. As depicted in FIG. 3, in an operation (301) SCSI device 201, and in particular cache balancer module 103, receives a write data command from host device 100 specifying the LBAs in the specific LU where the data is to be written. In an operation (302) cache balancer module 103 determines whether unified cache module 102 has sufficient free space to cache the data specified in the write command. Operation (302) may be performed by a search operation through the table entries in cache allocation table 104 that enables cache balancer module 103 to identify free and occupied segments of unified cache module 102.

If at operation 302 cache balancer module 103 determines that unified cache module 102 does not hold sufficient free space for caching the data to be written to the specified LU, then cache balancer module 103 initiates a selective flush operation by identifying one or more cache slots that can be evicted or invalidated. In operation (303) cache balancer module 103 de-allocates the corresponding cache slot(s) to provide free space for the data to be written. Cache balancer module 103 may perform selective flushing based on the cache allocation de-allocation policy specified by the system. In operation (304) cache balancer module 103 deletes the table entry(ies) corresponding to the de-allocated cache slot(s) and updates cache allocation table 104.

If it is determined at operation (302) that unified cache module 102 holds sufficient free space, then cache balancer module 103 allocates the cache slot(s) for the data to be written. In operation (305) cache balancer logs one or more new cache entries to the allocated in cache by caching the data from host device 100. The number of cache entries in the cache slot may depend on the number of logical blocks (data blocks) to be written to the specified LU in the write data command which was received from host device 100.

In operation (306) cache balancer module 103 updates cache allocation table 104 by registering a corresponding table entry to the cache allocation table 104 of the corresponding LU. In operation (307) cache balancer module 103 writes the cached data from the cache entries to the specified LBAs. In various embodiments, various operations of method 300 may be performed in the order presented, in a different order or simultaneously. Further, in some embodiments, some operations shown in FIG. 3 may be omitted.

Figure 4:
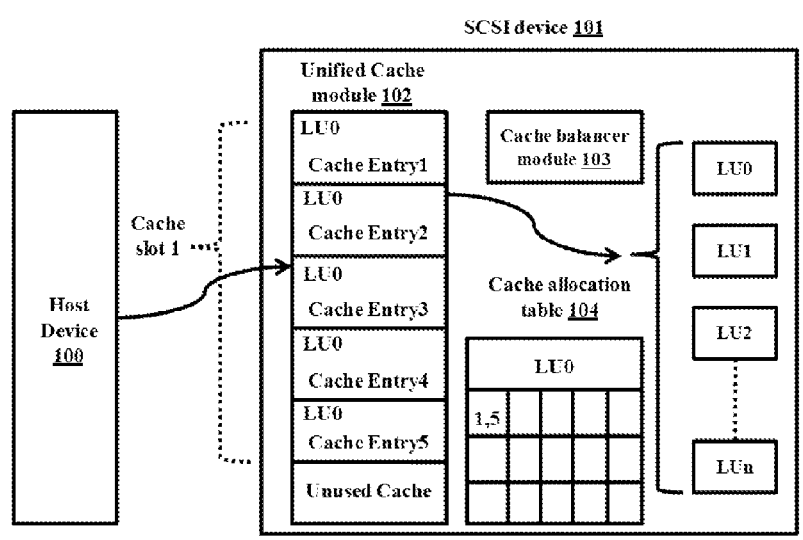
FIG. 4 illustrates an exemplary allocation of the unified cache to a single Logical Unit (LU), according to embodiments as disclosed herein.

FIG. 4 illustrates an exemplary allocation of the unified cache of unified cache module 102 to a single Logical Unit (LU), according to embodiments as disclosed herein. FIG. 4 depicts unified cache module 102 being allocated to single LU (e.g., LU0) by cache balancer module 103 where the five cache entries (cache entry 1 to cache entry 5) are logged for the single LU (e.g., LU0) in a single cache slot 1.

For example, in a write operation initiated by the host device 100, whenever host device 100 wants to write data to a range of LBAs of LU0, cache balancer module 103 can allocate unified cache module 102 entirely to LU0 and log contiguous cache entries in a single cache slot. Further, cache balancer module 103 registers a corresponding table entry for the allocated cache slot into cache allocation table 104 of LU0 as (1, 5). Here '1' indicates the unique address of the allocated cache slot of unified cache module 102 and '5' indicates the number of contiguous cache entries which are written to unified cache module 102. The cached data is later written to the storage medium (specified LU). The free space of unified cache module 102 is unused cache and can be allocated whenever a request is received for caching data.

Figure 5:
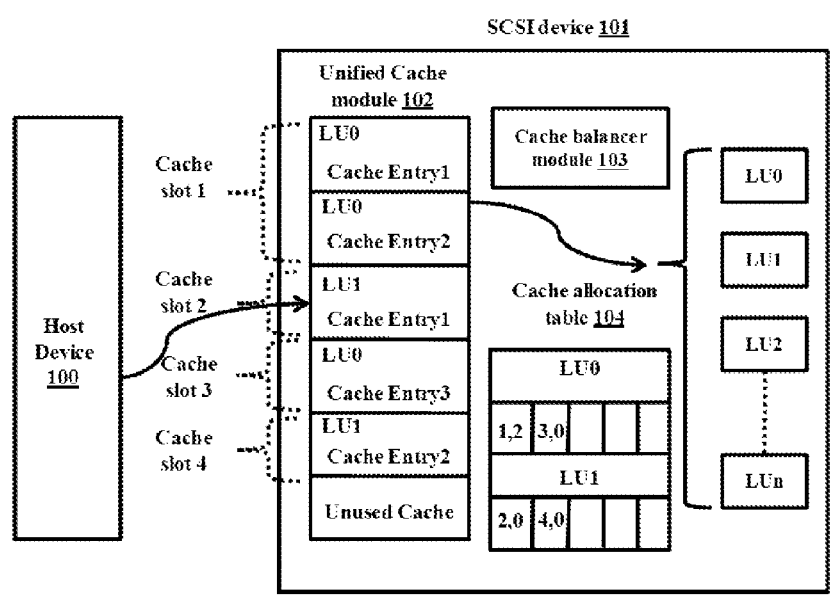
FIG. 5 illustrates an exemplary allocation of the unified cache to plurality of LUs, according to embodiments as disclosed herein.

FIG. 5 illustrates an exemplary allocation of the unified cache of unified cache module 102 to a plurality of LUs, according to embodiments as disclosed herein. FIG. 5 depicts unified cache module 102 allocated by cache balancer module 103 to two LUs, namely LU0 and LU1.

In an embodiment, unified cache module 102 can be assigned to a plurality of LUs.

For example, consider that host device 100 requests data to be written to LU0 at two logical blocks specified by LBA 1 and LBA 2. Cache balancer module 103 allocates cache slots of equal size to two cache entries for two logical blocks to be cached in unified cache module 102. Cache balancer module 103 logs the cache entry 1 and cache entry 2 in cache slot 1. Once the data is cached in unified cache 102, the cache balancer module 103 registers a corresponding table entry in the cache allocation table 104 as (1, 2). Here, '1' indicates the address of cache slot 1 and '2' indicates the number of contiguous cache entries within the allocated cache slot 1.

For example, if host device 100 initiates another write request for one block of data to be written to LU1, then the cache balancer module 103 logs the cache entry 1 for LU1 and registers a corresponding table entry in the cache allocation table 104 as (2,0). Here '2' indicates the address of cache slot 2 and '0' indicates there is no contiguous cache entry in the allocated cache slot 2. Cache allocation table 104 is updated continuously by registering the table entry for every allocation or de-allocation of cache slot comprising one or more cache entries. The second table entry (3, 0) in cache allocation table 104 for LU0 specifies cache slot 3 (identified by cache slot address 3) allocated to LU0 includes only one cache entry (0 contiguous cache entries). Similarly, the second table entry (4, 0) in cache allocation table 104 of LU1 indicates cache slot 4 with single cache entry (0 contiguous cache entries) is allocated to LU1. The free space of unified cache module 102 is unused cache and can be allocated whenever a request is received for caching data.

Figure 6:
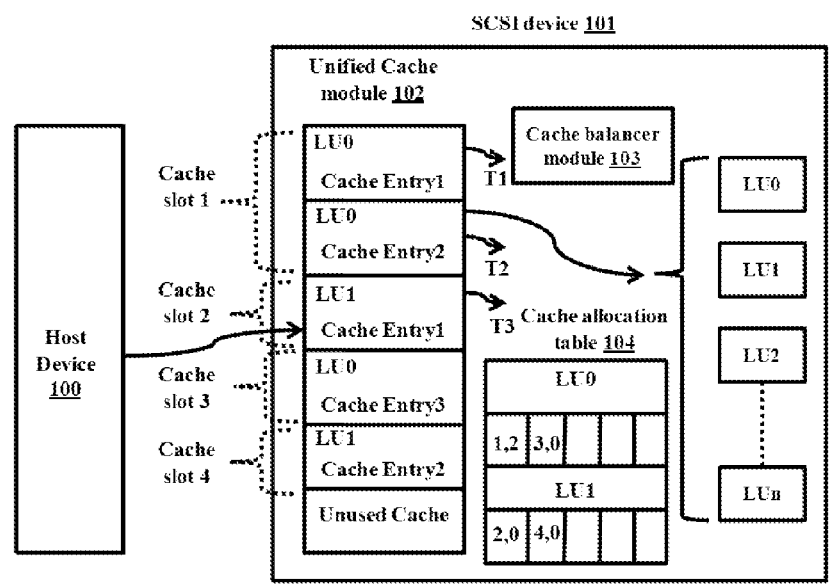
FIG. 6 illustrates an exemplary allocation of the unified cache to one or more LUs with one or more cache entries assigned with timers, according to embodiments as disclosed herein.

FIG. 6 illustrates an exemplary allocation of unified cache to one or more LUs with one or more cache entries associated with timers, according to embodiments as disclosed herein. Here, host device 100 initiates input/output (I/O) operations to read from, or write to, any of the LUs from LU0, LU1 to LUn using unified cache module 102. FIG. 6 depicts unified cache module 102 being allocated by cache balancer module 103 to two LUs, namely LU0 and LU1. One or more cache entries in unified cache module 102 are assigned with a timer value. FIG. 6 depicts cache entry 1 and cache entry 2 of LU0 and cache entry 1 of LU1 are assigned with the timer value. The expiry of the corresponding timer value invalidates the corresponding cache entry. This enables the system to evict the stale cache entries. Whenever stale cache entries are evicted, corresponding table entries in cache allocation table 104 are evicted by cache balancer module 103, thus de-allocating corresponding cache slots of unified cache module 102. This operation provides increased free space (unused space) in unified cache module 102.

The cache entries that are not assigned with timer values are invalidated by host device 100 whenever required as host device 100 maintains mapping in allocation table 104 of cache slots to LUs.

Figure 7:
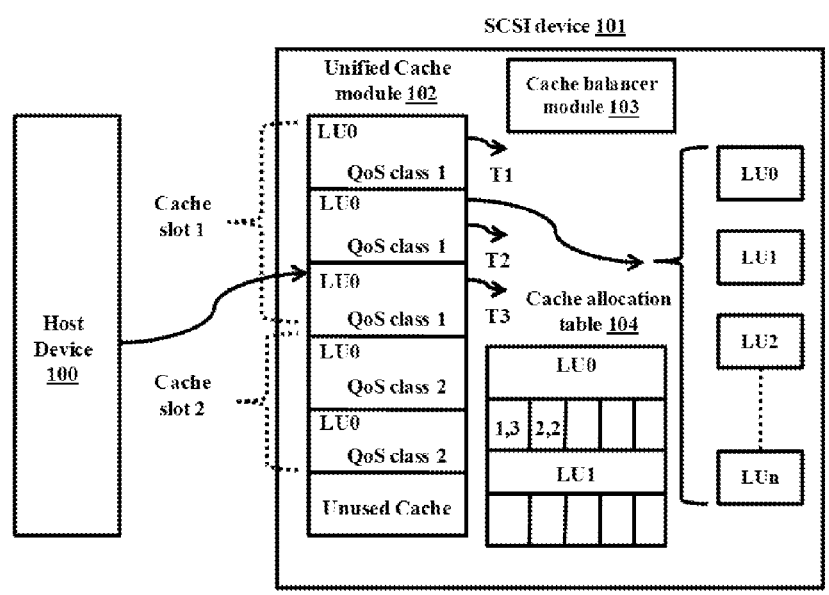
FIG. 7 illustrates an exemplary allocation of the unified cache to one or more Quality of Service (QoS) traffic classes of the LU, according to embodiments as disclosed herein.

FIG. 7 illustrates an exemplary allocation of the unified cache to one or more Quality of Service (QoS) traffic classes of the LU, according to embodiments as disclosed herein. Host device 100 requests input/output (I/O) operations to read from, or write to, any of the LUs from LU0, LU1 to LUn using unified cache module 102. FIG. 7 depicts unified cache 102 allocated by cache balancer module 103 to various QoS traffic classes of LU0 namely QoS class 1, QoS class 2. For example, the cache slot 1 with 3 contiguous cache entries is allocated to QoS class 1 with a corresponding first table entry for LU0 as (1, 3). The cache slot 2 with contiguous 2 cache entries is allocated to QoS class 2 with corresponding table entry as (2, 2).

In one or more embodiments, unified cache module 102 may be assigned to one or more QoS classes of one or more LUs in the SCSI device 101.

The classification of data in the LU0 according to the QoS traffic class enables cache balancer module 103 to distinguish between various QoS classes of data within the LU, prioritize the QoS classes, and define the caching policy to be applied based on the various QoS priorities. Thus, the data of various QoS classes can be treated independently of each other. For example QoS class 1 can pertain to audio data while QoS class 2 can appertain to video data. Caching the data according to the QoS class thus enables cache balancer module 103 to identify QoS class 1. Cache balancer module 103 then is able to apply a higher frequency for evicting the cache slot 1 holding QoS class 1 data (audio data) as audio data changes at a higher frequency. Comparatively cached data belonging to QoS class 2 (video data) may be evicted less frequently.

The table entries in cache allocation table 104 enable cache balancer module 103 to identify all cache slots belonging to a similar class of data and to provide the same type of treatment to these cache slots.

The embodiments disclosed herein can be implemented through at least one software program running on at least one hardware device and performing network management functions to control the elements. The elements shown in FIGS. 1, 4, 5, 6 and 7 include blocks which can be at least one of a hardware device, or a combination of one or more hardware devices and one or more software modules.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the embodiments as described herein.

What is claimed is:

1. A system, comprising:
a host device; and
a SCSI device,
wherein said SCSI device comprises:
a unified cache module,
a cache allocation table, and
a cache balancer module configured to:
allocate at least one cache slot in said unified cache module to at least one Logical Unit (LU) in response to receiving an input/output (I/O) request from said host device;
log at least one cache entry by caching data for said received I/O request to said at least one cache slot of said unified cache; and
register a table entry corresponding to said allocated at least one cache slot into said cache allocation table of said at least one LU.

2. The system of claim 1, wherein said at least one cache slot in said unified cache module comprises one or more contiguous cache entries.

3. The system of claim 1, wherein said cache balancer module is further configured to selectively flush said at least one cache slot to de-allocate corresponding segments of said unified cache module.

4. The system of claim 3, wherein said cache balancer module is further configured to selectively flush said at least one cache slot to de-allocate said corresponding segments based upon searching one or more table entries in said cache allocation table.

5. The system of claim 1, wherein said cache balancer module is further configured to assign at least one timer to said at least one cache entry for identifying stale cache entries to selectively flush said stale cache entries, and is further configured to update said cache allocation table by deleting said one or more table entries corresponding to said selectively flushed stale cache entries.

6. The system of claim 1, wherein said cache balancer module is configured to dynamically allocate said at least one cache slot of said unified cache for caching said data based on a Quality of Service (QoS) traffic class of said data of said at least one LU.

7. A method for dynamically allocating a unified cache to at least one Logical Unit (LU) of a Small Computer System Interface (SCSI) device, wherein said method comprises:
allocating at least one cache slot in a unified cache module to said at least one LU, in response to receiving an input/output (I/O) request from a host device;
a cache allocation unit logging at least one cache entry by caching data for said received I/O request to said at least one cache slot of said unified cache; and
registering a table entry corresponding to said allocated at least one cache slot into a cache allocation table of said at least one LU.

8. The method of claim 7, further comprising registering said table entry corresponding to said allocated at least one cache slot, wherein said at least one cache slot in said unified cache module comprises one or more contiguous cache entries.

9. The method of claim 7, further comprising selectively flushing said at least one cache slot to de-allocate corresponding segments of said unified cache module.

10. The method of claim 9, further comprising selectively flushing said at least one cache slot to de-allocate said corresponding segments based upon searching one or more table entries in said cache allocation table.

11. The method of claim 7, further comprising assigning at least one timer to said at least one cache entry for identifying stale cache entries to selectively flush said stale cache entries, and further comprising updating said cache allocation table by deleting said one or more table entries corresponding to said selectively flushed stale cache entries.

12. The method of claim 7, further comprising dynamically allocating said at least one cache slot of said unified cache for caching said data based on Quality of Service (QoS) traffic class of said data of said at least one LU.

13. A device, comprising:
a first memory device having stored therein a unified cache comprising cached data of one or more of a plurality of logical units of a host device, arranged in a plurality of cache slots, wherein at least some of the cache slots are dynamically-allocatable between the logical units;
a second memory device having stored therein a cache allocation table comprising a plurality of table entries each corresponding to at least one allocated cache slot in the unified cache, the cache allocation table being arranged to identify which of the allocated cache slots of the unified cache are allocated to which of the logical units; and a cache balancer module configured to:
dynamically allocate the cache slots in the unified cache among the logical units in response to receiving input/output (I/O) requests from the host device;
log cache entries for caching the data for the received I/O requests to the allocated cache slots of the unified cache; and
register in the cache allocation table the table entries corresponding to the allocated cache slots for each logical unit.

14. The device of claim 13, wherein the cache balancer module is configured to dynamically allocate a number of the cache slots for data stored in each logical unit based on a cache allocation policy which considers a quality of service traffic class for the data.

15. The device of claim 13, further comprising a plurality of timers assigned to a plurality of the cache entries in the unified cache, wherein the device is configured to determine that a cache entry is stale if the cache entry has not been accessed or modified for a predetermined time as measured by the timer assigned to the cache entry.

16. The device of claim 15, wherein when a cache entry is determined to be stale, the cache balancer module de-allocates segments of the unified cache that correspond to the cache entry.

17. The device of claim 16, wherein a first timer having a first time period is assigned to a first cache entry belonging to a first quality of service traffic class, and wherein a second timer having a second time period shorter than the first time period is assigned to a second cache entry belonging to a second quality of service traffic class which is lower than the first quality of service traffic class.

18. The device of claim 13, wherein the cache balancer module comprises a processor executing a software algorithm.

19. The device of claim 13, further comprising a Small Computer System Interface (SCSI) configured to receive the input/output (I/O) requests from the host device.

* * * * *